(12) United States Patent
Fayyad et al.

(10) Patent No.: US 7,885,748 B2
(45) Date of Patent: Feb. 8, 2011

(54) VIRTUAL ACCELEROMETER

(75) Inventors: Haytham A. Fayyad, Dexter, MI (US);
Min K. Kim, Troy, MI (US)

(73) Assignee: GM Global Technology Operations, Inc.

( * ) Notice: Subject to any disclaimer, the term of this patent is extended or adjusted under 35 U.S.C. 154(b) by 899 days.

(21) Appl. No.: 11/531,560

(22) Filed: Sep. 13, 2006

(65) Prior Publication Data
US 2008/0082245 A1  Apr. 3, 2008

(51) Int. Cl.
*B60W 10/02* (2006.01)
*B60W 50/06* (2006.01)
*B60W 30/02* (2006.01)

(52) U.S. Cl. .............................. 701/58; 701/68; 701/70; 477/904

(58) Field of Classification Search .................. 701/58, 701/68, 70; 477/904; 475/125, 266; 74/337
See application file for complete search history.

(56) References Cited

U.S. PATENT DOCUMENTS

| | | | | |
|---|---|---|---|---|
| 3,035,449 A | * | 5/1962 | Hollmann | 73/490 |
| 3,345,017 A | * | 10/1967 | Olah | 244/185 |
| 3,601,794 A | * | 8/1971 | Blomenkamp et al. | 340/464 |
| 3,634,792 A | * | 1/1972 | Blomenkamp et al. | 340/464 |
| 4,350,057 A | * | 9/1982 | Kishi et al. | 477/121 |
| 4,449,426 A | * | 5/1984 | Younger | 477/127 |
| 4,613,008 A | * | 9/1986 | Hiraiwa et al. | 180/247 |
| 4,989,149 A | * | 1/1991 | Mimura et al. | 701/95 |
| 5,109,967 A | * | 5/1992 | Saitou et al. | 192/76 |
| 5,197,006 A | * | 3/1993 | Saitou et al. | 701/51 |
| 5,460,583 A | * | 10/1995 | Kitada et al. | 477/154 |
| 5,679,099 A | * | 10/1997 | Kato et al. | 477/176 |
| 5,697,864 A | * | 12/1997 | Watanabe | 477/98 |
| 5,732,380 A | * | 3/1998 | Iwata | 701/85 |
| 5,888,171 A | * | 3/1999 | Sasaki et al. | 477/156 |
| 6,188,946 B1 | * | 2/2001 | Suzuki et al. | 701/62 |
| 6,267,189 B1 | * | 7/2001 | Nielsen et al. | 180/53.1 |

(Continued)

FOREIGN PATENT DOCUMENTS

DE  19712827  10/1997

(Continued)

OTHER PUBLICATIONS

Anonymous[Anon] Acceleration-based adaptive control for power-on downshift in automatic transmission adaptive oncoming clutch pressure by applying Kalman filter to measured output speed to calculate shaft acceleration signal. Derwent technical Abstract: Derwent-ACC-No. 1992-224260.RD 338058 A. Jun. 10, 1992. Copyright 2009 Derwent Information Ltd.*

(Continued)

*Primary Examiner*—Mark Hellner
*Assistant Examiner*—Ari M Diacou

(57) ABSTRACT

A vehicle control system for regulating operation of a vehicle having a transmission includes a first module that processes an output shaft signal which is based on rotation of an output shaft of the transmission through a third order Kalman filter to determine an acceleration of the output shaft. A second module calculates the acceleration of the vehicle based on the acceleration of said output shaft. A third module regulates operation of the vehicle based on the acceleration of the vehicle.

18 Claims, 4 Drawing Sheets

U.S. PATENT DOCUMENTS

| | | | |
|---|---|---|---|
| 6,328,673 B1 * | 12/2001 | Monowa et al. | 477/120 |
| 6,389,348 B1 * | 5/2002 | Takagi et al. | 701/58 |
| 6,631,317 B2 * | 10/2003 | Lu et al. | 701/45 |
| 6,863,047 B2 * | 3/2005 | Mijit et al. | 123/320 |
| 7,285,071 B2 * | 10/2007 | Nakajima et al. | 477/107 |
| 7,350,602 B2 * | 4/2008 | Colvin et al. | 180/65.28 |
| 2002/0065171 A1 * | 5/2002 | Raber | 477/175 |
| 2003/0143957 A1 * | 7/2003 | Lyon | 455/67.1 |
| 2005/0060092 A1 * | 3/2005 | Hablani | 701/213 |
| 2006/0136111 A1 * | 6/2006 | Robert et al. | 701/65 |
| 2009/0156356 A1 * | 6/2009 | Jiang | 477/86 |
| 2009/0227422 A1 * | 9/2009 | Fayyad et al. | 477/176 |

FOREIGN PATENT DOCUMENTS

| | | |
|---|---|---|
| DE | 19638278 | 3/1998 |
| DE | 102005012864 | 10/2005 |
| DE | 102005031428 | 3/2006 |
| JP | 08220121 | 8/1996 |
| JP | 10332739 | 12/1998 |

OTHER PUBLICATIONS

Anonymous[Anon] Adaptive electronic control system for automatic transmission shift calculates transmission input shaft acceleration by applying Kalman filter to measured input speed. Derwent technical Abstract: Derwent-ACC-No. 1994-132853. RD 359038 A. Feb. 20, 1994. Copyright 2009 Derwent Information Ltd.*

Paul Zarchan & Howard Musoff. Fundamentals of Kalman Filtering: A Practical Approach (Progress in Astronautics and Aeronautics). AIAA (American Institute of Aeronautics & Ast; 2 edition (Apr. 15, 2005) pp. 250-255.*

* cited by examiner

VIRTUAL ACCELEROMETER

FIELD

The present disclosure relates to vehicle operating parameter monitoring, and more particularly to a virtual accelerometer for monitoring a longitudinal acceleration of a vehicle.

BACKGROUND

The statements in this section merely provide background information related to the present disclosure and may not constitute prior art, Traditionally, vehicles include a power plant., such as an internal combustion engine, that generates drive torque, The drive torque is transferred through a power train and a driveline to a driven wheel or wheels. which propel the vehicle along a surface. The power train often includes a transmission that includes a plurality of selectable gear ratios that multiply the drive torque.

In the case where the transmission is provided as an automatic transmission, the gear shifts occur automatically based on the vehicle operating parameters including, but not limited to, vehicle speed, engine load and engine speed. Calibration parameters are predetermined for the transmission of a particular vehicle platform. More specifically, the calibration parameters are determined during pre-production driving tests, during which multiple shift maneuvers are executed. The magnitude of the longitudinal acceleration of the vehicle resulting from a gear shift is monitored and the calibration parameters are set to minimize the magnitude of the longitudinal acceleration to provide a smooth shift feel.

In order to monitor the magnitude of the longitudinal acceleration, a longitudinal accelerometer must be installed in the vehicle and must also be calibrated. Installation, calibration and maintenance of the longitudinal accelerometer increases both pre-production testing time and cost.

Some vehicles include a permanent longitudinal accelerometer that is implemented for example, with a vehicle stability enhancement system (VSES). Accordingly, the implementation of the longitudinal accelerometer includes associated component and installation costs, as well as maintenance costs associated with diagnosing and replacing a failed accelerometer. In-vehicle diagnostic routines are also complicated because they must monitor the performance of the longitudinal accelerometer to ensure that it is functioning properly.

SUMMARY

Accordingly, the present invention provides a vehicle control system for regulating operation of a vehicle having a transmission. The vehicle control system includes a first module that processes an output shaft signal, which is based on rotation of an output shaft of the transmission, through a third order Kalman filter to determine an acceleration of the output shaft. A second module calculates the acceleration of the vehicle based on the acceleration of said output shaft. A third module regulates operation of the vehicle based on the acceleration of the vehicle.

In another feature, the acceleration of the vehicle is a longitudinal acceleration.

In other features, the acceleration of the vehicle is further determined based on a wheel radius and a vehicle mass. The wheel radius and the vehicle mass are both constants pre-programmed into respective memory modules. Alternatively, the vehicle control system further includes respective modules that determine the wheel radius and the vehicle mass based on vehicle operating parameters.

In another feature, the first module calculates a derivative of the acceleration of the output shaft and provides the derivative as a feedback to said Kalman filter. The acceleration of the output shaft is further determined based on the derivative.

In still other features the third module regulates by adjusting a shift command of the transmission based on the acceleration of the vehicle. The vehicle control system further includes a fourth module that calculates a vehicle speed based on said output shaft signal, The adjusting is further based on the vehicle speed.

In yet other features, the third module regulates by operating a vehicle stability control system based on the acceleration of the vehicle, The vehicle control system further includes a fourth module that calculates a vehicle speed based on the output shaft signal. The vehicle stability control system is further operated based on the vehicle speed.

Further areas of applicability will become apparent from the description provided herein it should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
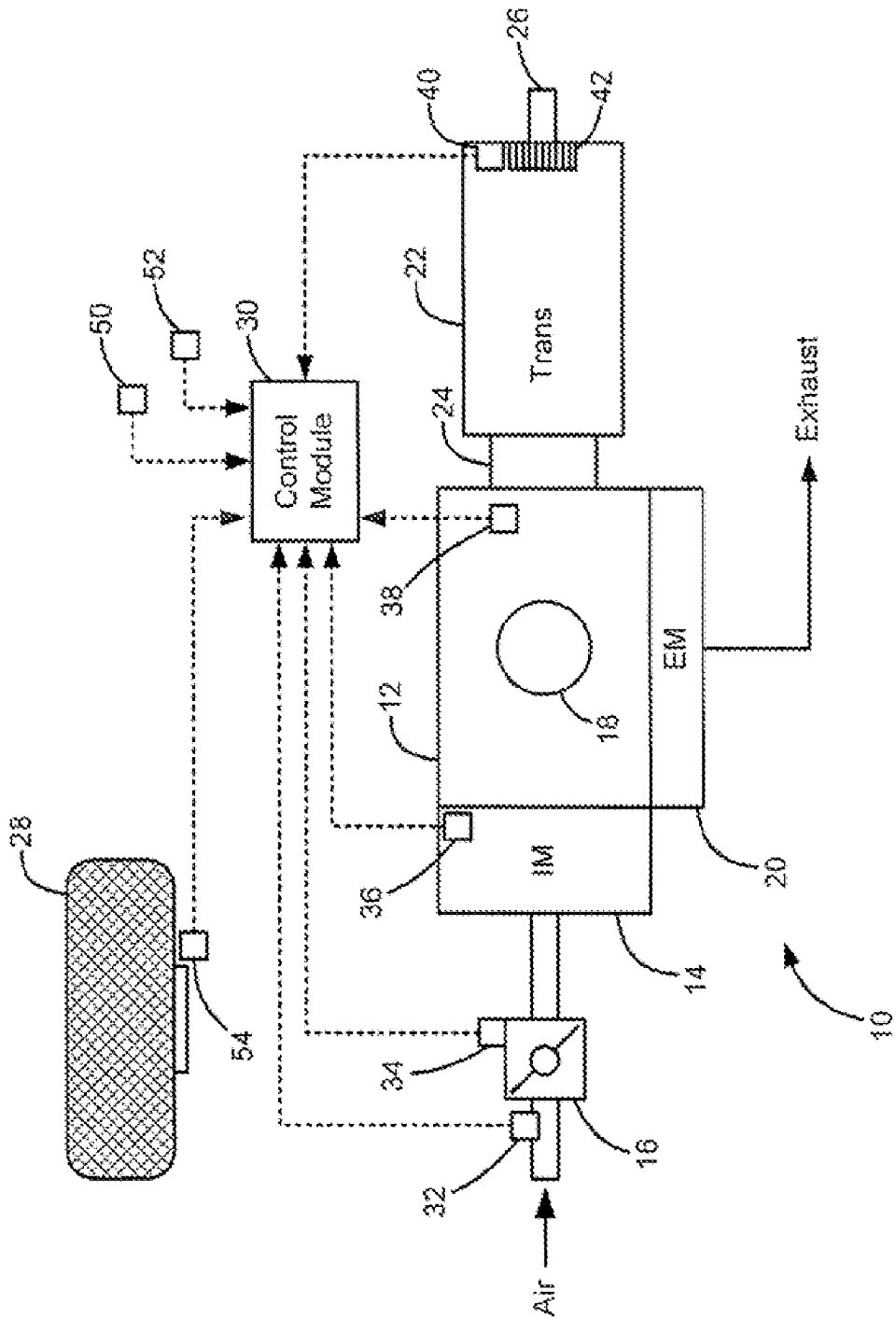
FIG. 1 is a functional block diagram of an exemplary vehicle system that implements a virtual accelerometer control in accordance with the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle system 10 includes an engine 12 that generates drive torque. More specifically, air is drawn into an intake manifold 14 through a throttle 16. The air is mixed with fuel, and the fuel and air mixture is combusted within a cylinder 18 to reciprocally drive a piston (not shown), which rotatably drives a crankshaft (not shown). Exhaust resulting from the combustion process, is exhausted through an exhaust manifold 20, is treated in an after-treatment system (not shown) and is released to atmosphere.

The crankshaft drives a transmission 22 through a coupling device 24. In the case of the transmission 22 being an automatic transmission, the coupling device 24 is provided as a torque converter. In the case of the transmission 22 being a manual transmission or an automated manual transmission, the coupling device 24 is provided as a clutch or an electronically controlled clutch (ECO). The transmission 22 includes an input shaft (not shown) and an output shaft 26, which transmits drive torque through a driveline (not shown) to rotatably drive a wheel or wheels 28.

A control module 30 regulates overall operation of the vehicle system 10 based on the virtual accelerometer control of the present invention. More specifically, the control module 30 receives vehicle operating parameter signals from a plurality of sensors and processes the virtual accelerometer control based thereon. Exemplary sensors include a mass air flow (MAF) sensor 32, a throttle position sensor 34, a manifold absolute pressure (MAP) sensor 36 and an engine RPM sensor 38.

The sensors also include an output shaft sensor 40 that generates a signal based on the rotation of the transmission output shaft 26. More specifically, the output shaft sensor 40 is responsive to a toothed wheel 42 that is fixed for rotation with the transmission output shaft 26. The output shaft sensor 40 generates a pulse signal or output shaft signal (OSS), wherein the pulses correspond to the rising and failing edges of the teeth of the toothed wheel 42. The OSS is transmitted to the control module 30, which process the virtual accelerometer control based thereon to determine a longitudinal acceleration ($a_{LONG}$) of the vehicle. As used herein, the term longitudinal refers to a fore/aft vehicle direction. More specifically, $a_{LONG}$ is determined based on OSS, a wheel radius ($r_{WHEEL}$) and a vehicle mass ($m_{VEH}$). $r_{WHEEL}$ and $m_{VEH}$ can be constants that are pre-stored in memory or can be calculated based on vehicle operating parameters (e.g., can be calculated using a tire pressure monitoring system).

Figure 2:
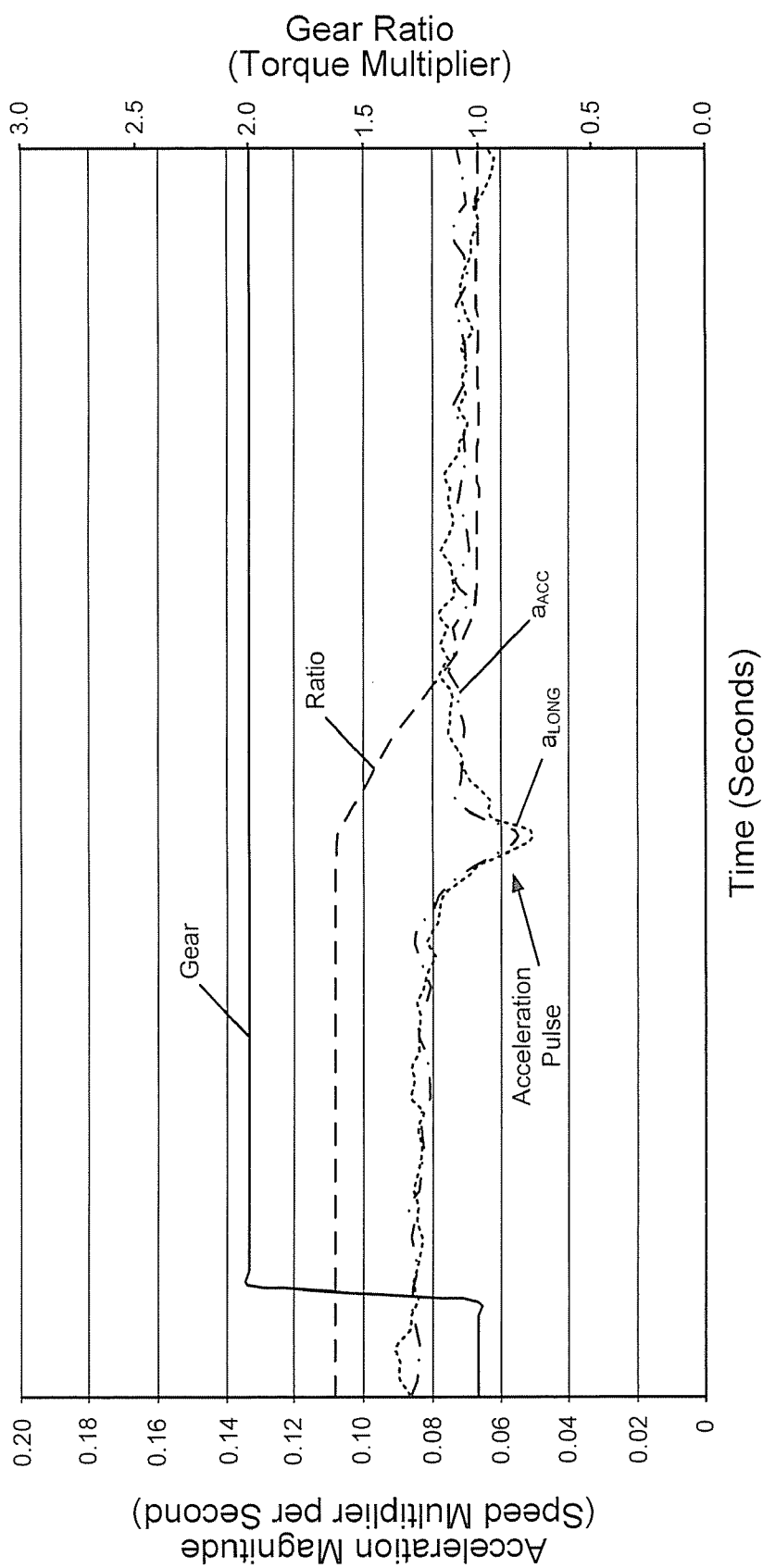
FIG. 2 is graph illustrating exemplary signal traces for an actual accelerometer and that generated using the virtual accelerometer control of the present invention for an exemplary transmission gear shift.

The virtual accelerometer control of the present invention processes the OSS through a $3^{rd}$ order Kalman filter to calculate a rotational speed ($\omega_{OS}$) of the output shaft 26, an acceleration ($a_{OS}$) of the output shaft 26 and a first derivative of the acceleration ($da_{OS}/dt$). The Kalman filter combines the concept of recursive least squares estimation with a state space model and noise model to optimally estimate a system characteristic. The Kalman filter estimates the characteristic of the system, in this case the output shaft 26 based on a linear model of the system. The linear model of the system includes a linear dynamic model, a description of the covariance of the errors in the system dynamics, and a description of the covariance of the errors in system measurements. The Kalman filter implements gain values that are selected to provide the desired signal to noise ratio. A vehicle velocity ($V_{VEH}$) can be determined based on $\omega_{OS}$, and $da_{OS}/dt$ is used as a feedback to stabilize the Kalman filter, $a_{LONG}$ is used to affect vehicle operation, as described in further detail below, With particular reference to FIG. 2: and as discussed in further detail below, the virtual accelerometer control of the present invention replaces an actual longitudinal accelerometer that would otherwise be implemented in the vehicle system 10. FIG. 2 is a graph that illustrates exemplary traces for a transmission gear shift from $1^{st}$ gear to $2^{nd}$ gear for an exemplary transmission. The traces include an acceleration signal using an actual accelerometer ($a_{ACT}$) and an acceleration signal ($a_{LONG}$) generated by the virtual accelerometer control of the present invention. As illustrated, $a_{LONG}$ tracks $a_{ACT}$ with sufficient accuracy during the shift maneuver. Accordingly, an actual accelerometer is not required in a vehicle system that implements the virtual accelerometer control of the present invention.

In an exemplary embodiment, the virtual accelerometer control can be implemented by an OEM during vehicle development to calibrate transmission gear shifting. More specifically, $a_{LONG}$ can be calculated using the virtual accelerometer control during pre-production calibration shift maneuvers. In this manner, the calibration gains associated with the gear ratio shifts can be adjusted based on $a_{LONG}$ to provide a smooth gear shifts. For examples the magnitude of an acceleration pulse resulting from a transmission gear ratio change (see FIG. 2) can be measured and the calibration gains can be adjusted to minimize the magnitude of the acceleration pulse. The calibration gains are programmed into each transmission control module of a production vehicle platform.

In another exemplary embodiment, the virtual accelerometer control can be used throughout the vehicle lifetime to automatically update the above-described calibration gains. More specifically, the control module can monitor $a_{LONG}$ during transmission shifts and adjust the calibration shifts to improve the shift smoothness, which may otherwise deteriorate due to aging and wear of the transmission components.

In still another exemplary embodiment, the exemplary vehicle system can includes a vehicle stability enhancement system (VSES) that corrects or improves the vehicle drivability. For example, the VSES can correct an oversteer or understeer condition, as well as adjust a vehicle yaw rate to match a desired vehicle yaw rate by regulating braking of individual wheels, by vectoring torque to specific wheels and/or by adjusting an engine torque/speed output. The VSES can include a yaw sensor 50 a lateral accelerometer 52 and/or ABS sensors 54 associated with each of the vehicle wheels 28. The VSES operates based on the signals generated by these sensors, as well as $a_{LONG}$, which is determined using the virtual accelerometer control of the present invention.

Figure 3:
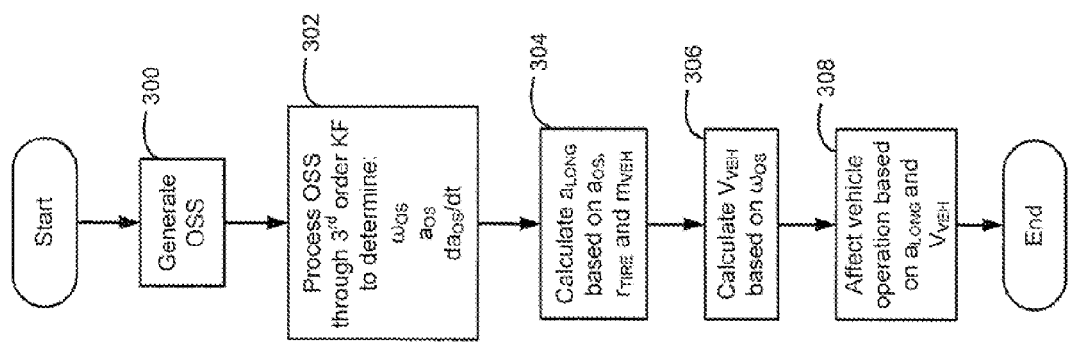
FIG. 3 is a flowchart illustrating exemplary steps executed by the virtual accelerometer control of the present inventions and FIG. 4 is a functional block diagram of exemplary modules that execute the virtual accelerometer control of the present invention.

Referring now to FIG. 3, exemplary steps executed by the virtual accelerometer control of the present invention will be described in detail in step 300, the OSS is generated using the OSS sensor. In step 302; the OSS is processed through the $3^{rd}$ order Kalman filter to provide $\omega_{OS}$, $a_{OS}$, and $da_{OS}/dt$. In step 304, control calculates $a_{LONG}$ based on $a_{OS}$, $r_{TIRE}$ and $m_{VEH}$, Control determines $V_{VEH}$ based on $\omega_{OS}$ in step 306. In step 308, control affects vehicle operation based on $a_{LONG}$, and/or $V_{VEH}$ and control ends.

Figure 4:
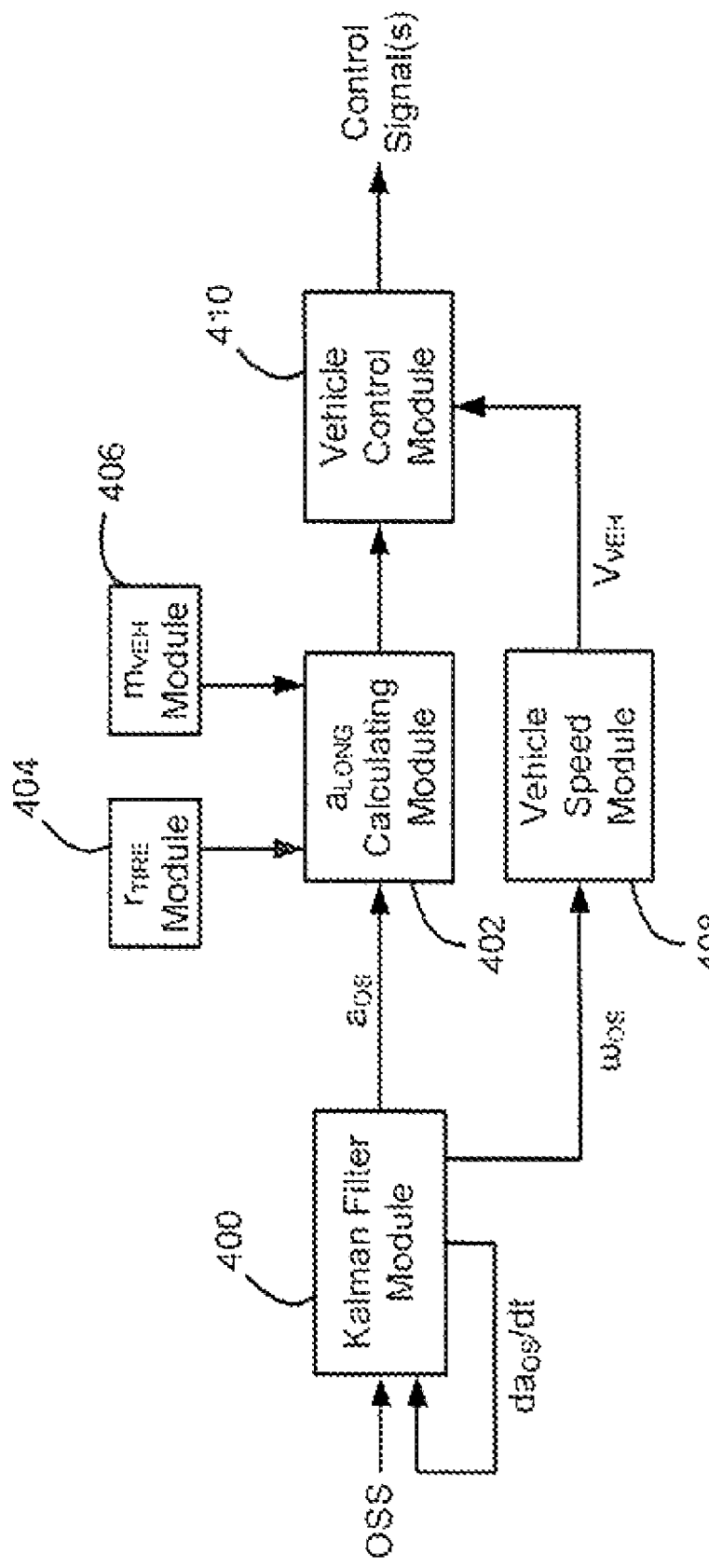

Referring now to FIG. 4, exemplary modules that execute the virtual accelerometer control of the present invention will be described in detail. The exemplary modules include a Kalman filter module 400, an $a_{LONG}$ calculating module, an $r_{TIRE}$ module 404, an $m_{VEH}$ module 406, a vehicle speed module 408 and a vehicle control module 410, The Kalman filter module 400 determines $\omega_{OS}$, $a_{OS}$ and $da_{OS}/dt$ based on OSS and using $da_{OS}/dt$ as a feedback value.

The $a_{LONG}$ module 402 calculates $a_{LONG}$ based on $a_{OS}$, $r_{TIRE}$ and $m_{VEH}$. More specifically, $r_{TIRE}$ and $m_{VEH}$ are provided by their respective modules 404, 406. For example, the modules 404, 406 can be provided as memory modules that respectively store $r_{TIRE}$ and $m_{VEH}$, or can each process vehicle operating parameters to calculate $r_{TIRE}$ and $m_{VEH}$. The vehicle speed module 408 determines $v_{VEH}$ based on $\omega_{OS}$.

The vehicle control module 410 generates control signals that affect vehicle operation based on $a_{LONG}$ and $v_{VEH}$ For example, the vehicle control module 410 can adjust the shifting parameters of the transmission to provide a smoother shift transition. Alternatively, the vehicle control module 410 can operate a VSES to correct and/or improve vehicle handling. For example, the VSES can correct an actual vehicle yaw rate to be closer to a desired vehicle yaw rate, can correct an understeer/oversteer condition and/or can correct a wheel slip condition.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle control system for regulating operation of a vehicle having a transmission, comprising:
    a first module that processes an output shaft signal, which is based on rotation of an output shaft of said transmission, through a third order Kalman filter to determine an acceleration of said output shaft;
    a second module that calculates an acceleration of said vehicle based on said acceleration of said output shaft; and
    a third module that (i) based on said acceleration of said vehicle, detects at least one of driveline clunk and rough road, (ii) based on said detection of driveline clunk, at least one of identifies and corrects a component of said vehicle causing said driveline clunk, and (iii) based on said detection of rough road, selectively prevents detection of an engine misfire.

2. The vehicle control system of claim 1 wherein said acceleration of said vehicle is a longitudinal acceleration.

3. The vehicle control system of claim 1 wherein said acceleration of said vehicle is further determined based on a wheel radius and a vehicle mass.

4. The vehicle control system of claim 3 wherein said wheel radius and said vehicle mass are both constants pre-programmed into respective memory modules.

5. The vehicle control system of claim 3 further comprising respective modules that determine said wheel radius and said vehicle mass based on vehicle operating parameters.

6. The vehicle control system of claim 1 wherein said first module calculates a derivative of said acceleration of said output shaft, and provides said derivative as a feedback to said Kalman filter, wherein said acceleration of said output shaft is further determined based on said derivative.

7. The vehicle control system of claim 1 further comprising a fourth module that calculates a vehicle speed based on said output shaft signal, wherein said adjusting is further based on said vehicle speed.

8. The vehicle control system of claim 1 wherein said third module operates a vehicle stability control system based on said acceleration of said vehicle, wherein said vehicle stability control system at least one of corrects vehicle understeer, corrects vehicle oversteer, and adjusts a yaw rate of said vehicle.

9. The vehicle control system of claim 8 further comprising a fourth module that calculates a vehicle speed based on said output shaft signal, wherein said vehicle stability control system is further operated based on said vehicle speed.

10. A method of regulating operation of a vehicle having a transmission, comprising:
    generating an output shaft signal based on rotation of an output shaft of said transmission;
    processing said output shaft signal through a third order Kalman filter to determine an acceleration of said output shaft;
    calculating an acceleration of said vehicle based on said acceleration of said output shaft;
    detecting at least one of driveline clunk and rough road based on said acceleration of said vehicle;
    based on said detection of driveline clunk, at least one of identifying and correcting a component of said vehicle causing said driveline clunk; and
    based on said detection of rough road, selectively preventing detection of an engine misfire.

11. The method of claim 10 wherein said acceleration of said vehicle is a longitudinal acceleration.

12. The method of claim 10 wherein said acceleration of said vehicle is further determined based on a wheel radius and a vehicle mass.

13. The method of claim 12 wherein said wheel radius and said vehicle mass are both constants pre-programmed into a memory.

14. The method of claim 12 further comprising determining said wheel radius and said vehicle mass based on vehicle operating parameters.

15. The method of claim 10 further comprising:
    calculating a derivative of said acceleration of said output shaft; and
    providing said derivative as a feedback to said Kalman filter, wherein said acceleration of said output shaft is further determined based on said derivative.

16. The method of claim 10 further comprising calculating a vehicle speed based on said output shaft signal, wherein said calibrating is further based on said vehicle speed.

17. The method of claim 10, further comprising operating a vehicle stability control system based on said acceleration of said vehicle, wherein said vehicle stability control system at least one of corrects vehicle understeer, corrects vehicle oversteer, and adjusts a yaw rate of said vehicle.

18. The method of claim 17 further comprising calculating a vehicle speed based on said output shaft signal, wherein said vehicle stability control system is further operated based on said vehicle speed.

* * * * *